US007082309B2

(12) United States Patent
Park

(10) Patent No.: US 7,082,309 B2
(45) Date of Patent: Jul. 25, 2006

(54) METHOD FOR PROVIDING CALL PROCESSING SERVICE IN TRAFFIC CONGESTION STATE

(75) Inventor: Jong-Man Park, Anyang (KR)

(73) Assignee: Samsung Electronics Co., Ltd. (KR)

( * ) Notice: Subject to any disclaimer, the term of this patent is extended or adjusted under 35 U.S.C. 154(b) by 49 days.

(21) Appl. No.: 10/767,889

(22) Filed: Jan. 29, 2004

(65) Prior Publication Data

US 2004/0184419 A1 Sep. 23, 2004

(30) Foreign Application Priority Data

Jan. 29, 2003 (KR) .................. 10-2003-0006009

(51) Int. Cl.
*H04Q 7/20* (2006.01)
(52) U.S. Cl. .................. 455/445; 455/450; 455/452.1; 455/452.2; 455/466
(58) Field of Classification Search ................ 455/450, 455/428, 445, 452.2–453, 458, 466, 566; 370/328, 216, 227, 348
See application file for complete search history.

(56) References Cited

U.S. PATENT DOCUMENTS

| | | | | |
|---|---|---|---|---|
| 5,860,058 A * | 1/1999 | Daniel et al. | ................ | 455/445 |
| 5,862,485 A * | 1/1999 | Linneweh et al. | ........... | 455/450 |
| 6,084,865 A * | 7/2000 | Dent | .......................... | 370/321 |
| 6,343,216 B1 * | 1/2002 | Kim et al. | ................... | 455/458 |
| 6,456,617 B1 * | 9/2002 | Oda et al. | ................... | 370/352 |
| 6,600,720 B1 * | 7/2003 | Gvozdanovic | ............. | 370/230 |
| 6,633,760 B1 * | 10/2003 | Ham et al. | ................ | 455/422.1 |
| 6,667,962 B1 * | 12/2003 | Lee et al. | ................... | 370/335 |
| 6,745,031 B1 * | 6/2004 | Chun et al. | .............. | 455/435.1 |
| 6,766,173 B1 * | 7/2004 | Chun et al. | .................. | 455/450 |
| 6,937,851 B1 * | 8/2005 | Jung et al. | ................... | 455/455 |
| 2001/0003095 A1 * | 6/2001 | Benz et al. | .................. | 455/517 |
| 2002/0142784 A1 * | 10/2002 | Abrishamkar et al. | ...... | 455/458 |
| 2002/0181394 A1 * | 12/2002 | Partain et al. | .............. | 370/229 |
| 2003/0013441 A1 * | 1/2003 | Bhogal et al. | ............. | 455/423 |
| 2003/0043762 A1 * | 3/2003 | Pang et al. | ................. | 370/328 |
| 2005/0048981 A1 * | 3/2005 | Anupam et al. | ............ | 455/445 |
| 2005/0113029 A1 * | 5/2005 | Kolvukangas et al. | ... | 455/67.11 |

FOREIGN PATENT DOCUMENTS

KR 1999-59408 12/1999

* cited by examiner

*Primary Examiner*—Joseph Feild
*Assistant Examiner*—Kamran Afshar
(74) *Attorney, Agent, or Firm*—Dilworth & Barrese LLP

(57) ABSTRACT

A method for providing a call processing service wherein a short message can be transmitted to another party using a signaling channel in cases where a traffic channel cannot be allocated (for example, in traffic congestion state). The method comprises allowing a mobile switching center to transmit a call proceeding signal to a mobile station of a calling subscriber through a radio network controller, allowing the mobile switching center and the radio network controller to carry out a resource reservation therebetween, allowing the mobile switching center to make reserved resources available and then transmit a facility signal to the mobile station, the facility signal including information about a cause of a call failure, and allowing the mobile station to receive the facility signal and then display the information about the cause of the call failure.

10 Claims, 5 Drawing Sheets

METHOD FOR PROVIDING CALL PROCESSING SERVICE IN TRAFFIC CONGESTION STATE

PRIORITY

This application claims priority to an application entitled "METHOD FOR PROVIDING CALL PROCESSING SERVICE IN TRAFFIC CONGESTION STATE", filed in the Korean Industrial Property Office on Jan. 29, 2003 and assigned Serial No. 2003-6009, the contents of which are hereby incorporated by reference.

BACKGROUND OF THE INVENTION

1. Field of the Invention

The present invention relates to a method for providing a call processing service in a mobile communication network, and more particularly to a method for providing a call processing service in which a user can transmit his/her message to another party even when a traffic channel cannot be allocated due to traffic congestion.

2. Description of the Related Art

Generally, call traffic tends to increase sharply on a special day such as Christmas day or other special occasions. When a user of a mobile terminal is in a place where people gather on such a special day, he/she may have problems making or receiving a call. Namely, traffic in the mobile communication network enters such a congested state that it exceeds a traffic channel accommodation capacity of the network or system, thereby making it impossible for the system to allocate further traffic resources to a desired call. At this time, the wait time is excessive until available resources can be again provided, so the system releases the attempted call.

In such a case, a calling subscriber may be seriously inconvenienced since he/she is not aware of the reason why his/her call continuously fails to be connected. The subscriber may be more inconvenienced in cases that he/she must urgently communicate with the other party.

Recently, a technique has been developed which provides an announcement message to a subscriber in a wired network when a trunk line is in a congestion state. This technique is disclosed in Korean Patent Application No. 1999-59408, entitled "Apparatus For Sending Out Announcement Message In Case That V5.2 Interface Trunk Line Is In Congestion State". V5.2 interface is one of standards for terminal device connection in case that data transmission is accomplished using an existing telephone network, which is well known. As disclosed in this application, the announcement message is provided using pre-allocated resources such as a dedicated channel for traffic. However, the use of the pre-allocated resources is very inefficient in radio environments. Since the above technique merely provides the announcement message, it cannot resolve a user's inconvenience when he/she has to communicate with others urgently.

SUMMARY OF THE INVENTION

Therefore, the present invention has been made in view of the above problems, and it is an object of the present invention to provide a method for providing a call processing service wherein a desired call is not released unconditionally, even when a traffic channel cannot be allocated in a mobile communication network, allowing a user to recognize the cause of the call failure.

It is another object of the present invention to provide a method for proving a call processing service, wherein, even though a traffic channel cannot be allocated in a mobile communication network, a user can be made aware of the cause of a call failure, and transmit his/her message to another party by changing a current call service to a short message service using a signaling channel maintained until that time.

In accordance with the present invention, the above and other objects can be accomplished by the provision of a method for providing a call processing service in traffic congestion state in a mobile communication network, comprising the steps of: allowing a mobile switching center to transmit a call proceeding signal to a mobile station of a calling subscriber through a radio network controller; allowing the mobile switching center and the radio network controller to carry out a resource reservation therebetween; allowing the mobile switching center to make reserved resources available and then transmit a facility signal to the mobile station, the facility signal including information about a cause of a call failure; and allowing the mobile station to receive the facility signal and then display the information about the cause of the call failure.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
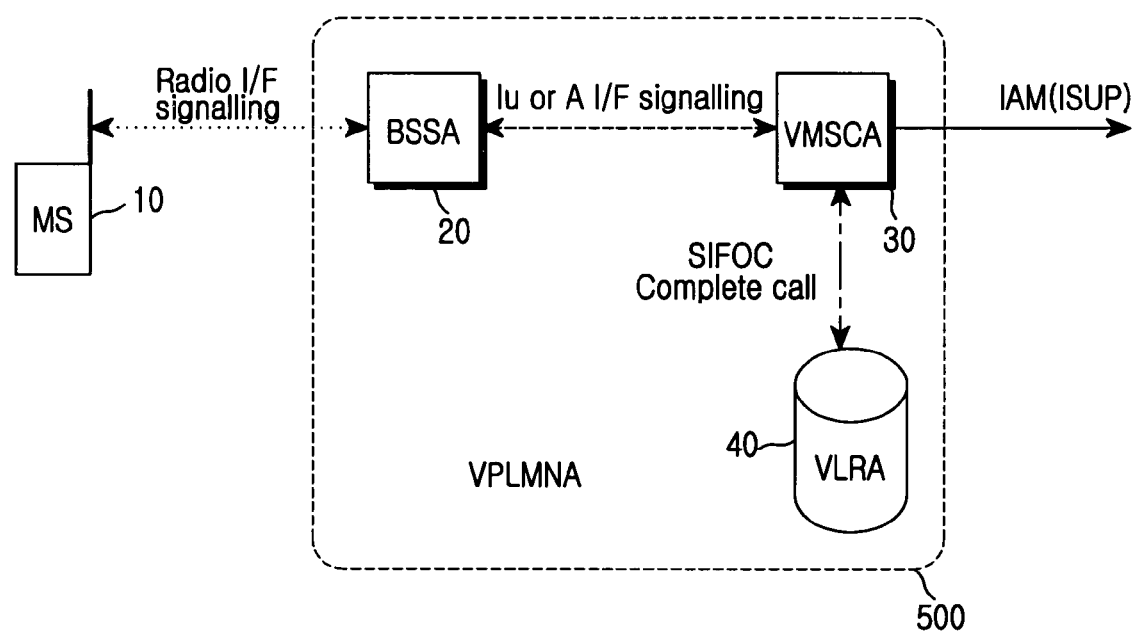
FIG. 1 is a view showing the construction of a network for processing an outgoing call of a mobile station.

Now, preferred embodiments of the present invention will be described in detail with reference to the annexed drawings. In the drawings, the same or similar elements are denoted by the same reference numerals even though they are depicted in different drawings. In the following description of the present invention, a detailed description of known functions and configurations incorporated herein have been omitted when they may make the subject matter of the present invention unclear.

FIG. 1 is a view showing the construction of a network for processing an outgoing call of a mobile station, which is disclosed in the 3GPP TS 23.018 V3.8.0 (2001-06) standard.

Reference numeral 10 denotes a mobile station (hereinafter referred to as an MS). Reference numeral 500 denotes a visited public land mobile network (hereinafter referred to as a PLMN) of a calling subscriber (sometimes referred to hereinafter as an "subscriber A" or "A"). The visited PLMN of the subscriber A will hereinafter be referred to as VPLMNA. Reference numeral 20 denotes a base station subsystem (hereinafter referred to as a BSS) to which the calling subscriber belongs. The BSS of subscriber A will hereinafter be referred to be as BSSA. Reference numeral 30 denotes a visited mobile switching center (hereinafter referred to as an MSC) of the calling subscriber. The visited MSC of the subscriber A will hereinafter be referred to as VMSCA. Reference numeral 40 denotes a visitor location register (hereinafter referred to as a VLR) in which subscriber information of the calling subscriber is registered. The VLR of subscriber A will hereinafter be referred to as VLRA.

In FIG. 1, a traffic channel saturation state may occur when traffic channel resources are allocated in a radio interface (I/F) signaling part between MS 10 and BSSA 20 or in an Iu or air interface (A I/F) part between BSSA 20 and VMSCA 30. "Iu" is one of 3GPP Standard Interface Specification. More particularly, it is a signaling interface specification between MSC (Mobile Switching Center) and RNC (Radio Network Controller) and divided into Iu-CS (Circuit Domain) and Iu-PS (Packet Domain). It is generally used as a interface in GSM. It should be noted that most traffic channel saturation states occur in the radio interface signaling part between MS 10 and BSSA 20, which provides limited resources. The reason for this is that an exchange is implemented with an optical fiber capable of providing abundant resources, or hardware supporting them when it is based on an asynchronous transfer mode (ATM), so it is rarely affected by the allocation of a small amount of resources (for example, 12.2 kbps of UMTS voice).

Figure 2:
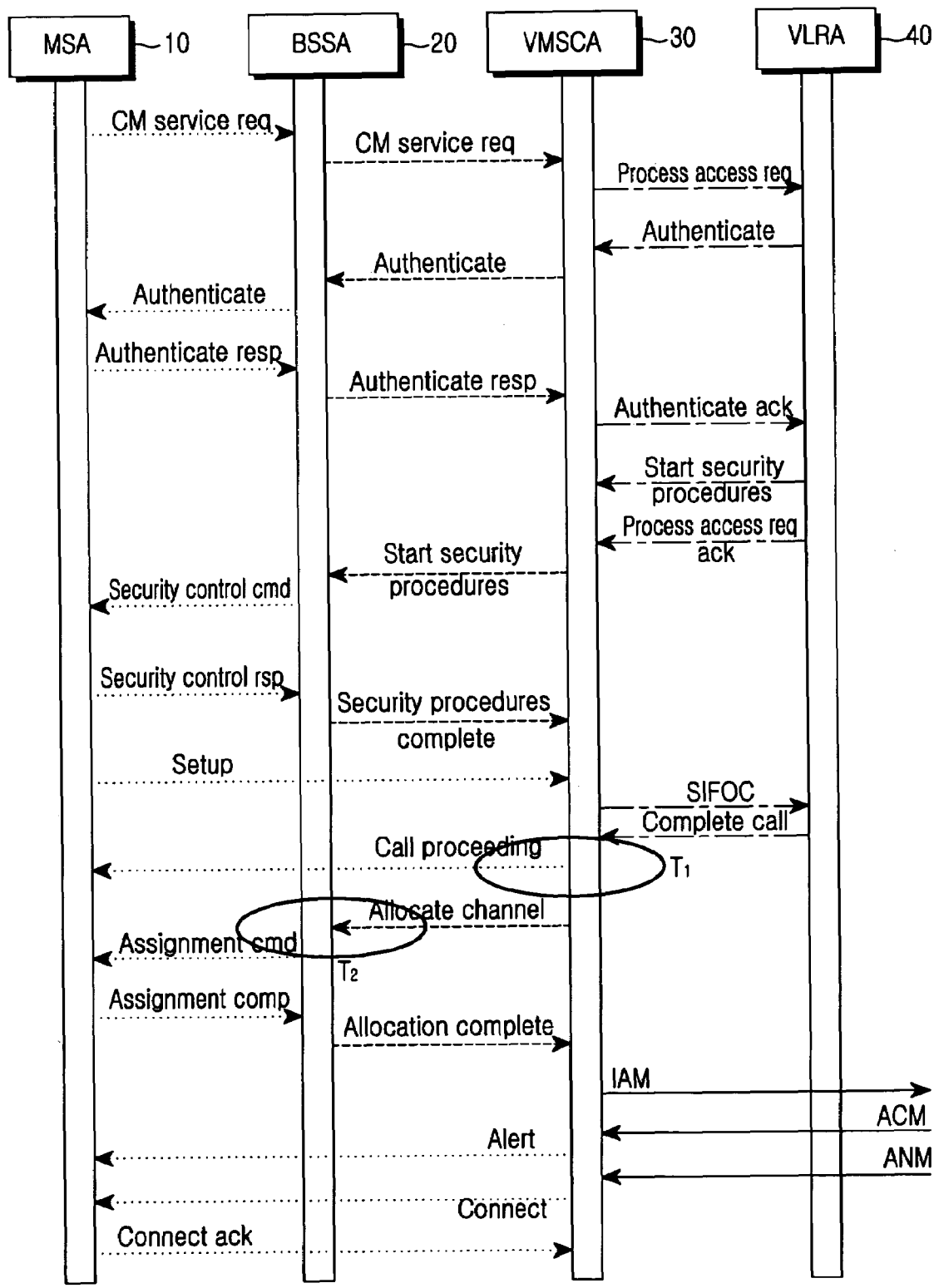
FIG. 2 is a flow diagram showing a procedure for processing the outgoing call of the mobile station.

FIG. 2 is a flow diagram showing a procedure of processing the outgoing call of the mobile station, which is disclosed in the 3GPP TS 23.018 V3.8.0 (2001-06) standard.

When a user of MS 10 originates a call, a connection management (CM) service request signal (CM service req) generated from MS 10 is transmitted to VMSCA 30 through BSSA 20. VMSCA 30 transmits a process access request signal (process access req) to VLRA 40. VLRA 40 initiates authentication. If VLRA 40 transmits an authentication signal to MS 10 through VMSCA 30 and BSSA 20, MS 10 transmits an authentication response (authenticate resp) to BSSA 20. BSSA 20 then transmits the authenticate resp to VMSCA 30, and VMSCA 30 transmits an authentication acknowledge (authenticate ack) to VLRA 40.

In addition, VLRA 40 initiates security procedures. VLRA 40 transmits a start security procedures message and a process access request acknowledge (process access req ack) to VMSCA 30. VMSCA 30 transmits the start security procedures message to BSSA 20. BSSA 20 then initiates security procedures. If the security procedures have been successfully initiated, a security control command (security control cmd) is transmitted to MS 10. And then, if MS 10 transmits a security control response (security control rsp) to BSSA 20, BSSA 20 transmits a security procedure complete message to VMSCA 30.

As described above, when the CM service is accepted, the MS 10 transmits a set-up message containing a subscriber B address via BSSA 20 to VMSCA 30. VMSCA 30 transmits a send information for outgoing call (SIFOC) message to VLRA 40 to provide information of an outgoing call. At this point, if VLRA 40 determines that a call should be connected, it transmits a complete call message for proceeding the call to VMSCA 30. VMSCA 30 transmits a call proceeding message to MS 10 through BSSA 20, to indicate that the call request has been accepted.

VMSCA 30 transmits an allocate channel message to BSSA 20, to trigger BSSA 20 and MS 10 to set up a traffic channel over a radio interface. When MS 10 receives an assignment command (assignment cmd) from BSSA 20, it transmits an assignment complete (assignment comp) message to BSSA 20. And then, BSSA 20 transmits the traffic channel allocation complete message to VMSCA 30, and a traffic channel assignment process is completed.

When the traffic channel assignment process is completed, VMSCA 30 constructs an ISDN service user part (ISUP) initial address message (IAM) using the subscriber B address and transmits it to a destination exchange (not shown). Thereafter, when the destination exchange returns an ISUP address complete message (ACM), VMSCA 30 transmits an alerting message to MS 10 through the BSSA 20, to indicate to a calling user that subscriber B is being alerted. When the destination exchange transmits an answer message (ANM), VMSCA 30 transmits a connect message to MS 10 through BSSA 20, to instruct MS 10 to connect a speech path.

Portions $T_1$ and $T_2$, indicated by ellipses in FIG. 2, include points where the call starts to be released due to traffic saturation. When traffic is in a congestion state, the call is released in the portion $T_1$ or $T_2$. The probability of the call release is very high in the portion $T_2$ since radio resources are more limited than wired resources.

Figure 3:
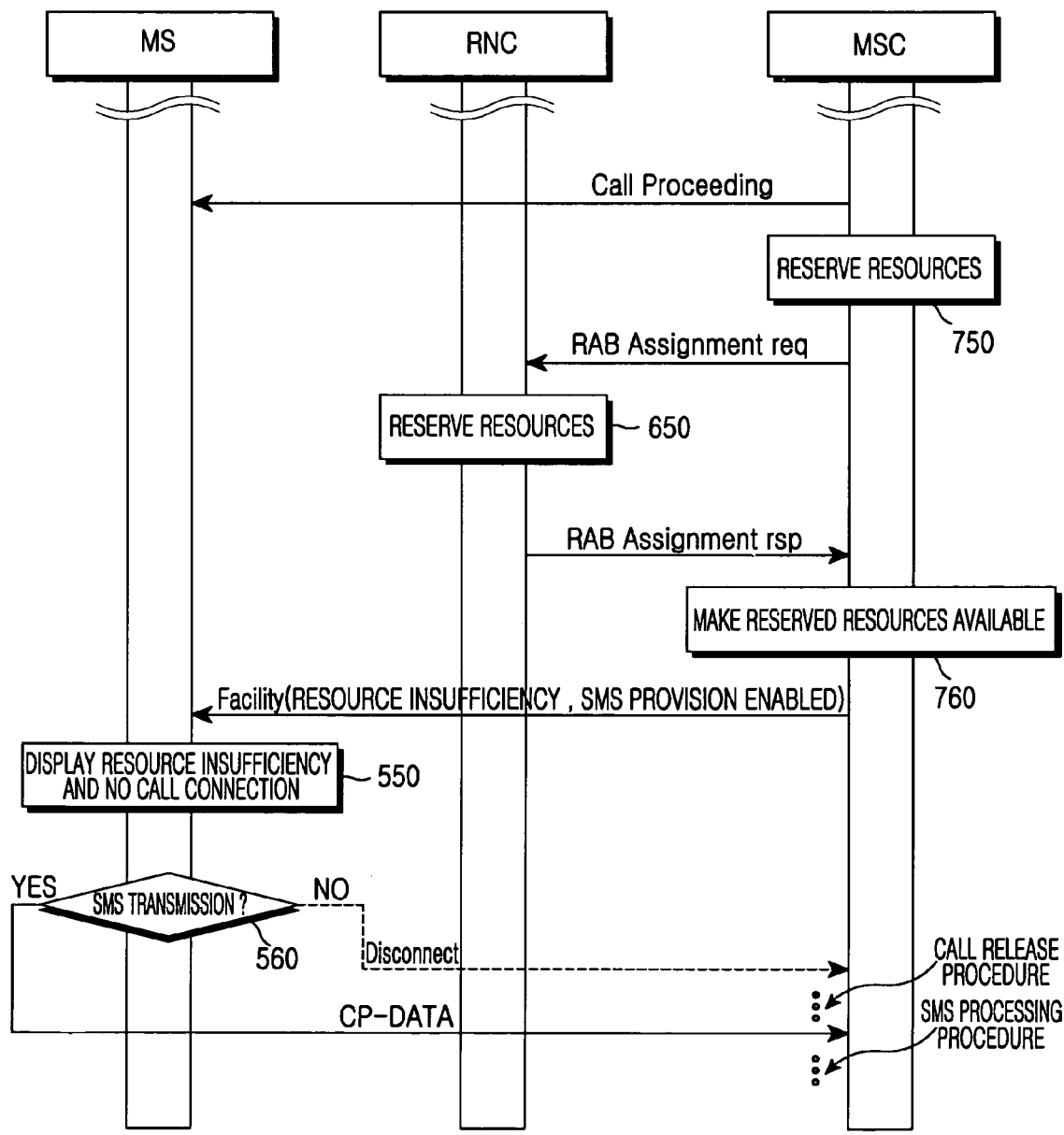
FIG. 3 is a flow diagram illustrating a method for changing a current call service to a short message service without releasing a desired call under the condition that a speech path cannot be set up due to traffic congestion, in accordance with a first embodiment of the present invention.

FIG. 3 is a flow diagram illustrating a method for changing a current call service to a short message service without releasing a desired call under the condition that a speech path cannot be set up due to traffic congestion, in accordance with the first embodiment of the present invention.

In this embodiment, an ATM-based RNC (Radio Network Controller) and an ATM-based MSC are used. In other words, the RNC and the MSC support an ATM switching function. To this end, the RNC and the MSC also support an AAL2 (ATM Adaptation Layer type 2). The reason is that an AAL2 technology suitable for the ATM switching is used in a radio environment so that mini ATM cells can be efficiently used utilizing ATM resources.

Procedures performed until the MSC sends a call proceeding message to the MS are not depicted in detail in FIG. 3 since they are well known in the art (see the corresponding parts of FIG. 2).

After the MSC sends the call proceeding message to the MS, a resource reservation is carried out between the RNC and the MSC. In order that the ATM-based MSC sets up a virtual connection with the RNC, at step 750 it reserves a corresponding virtual path identifier (hereinafter referred to as a VPI) and a corresponding virtual channel identifier (hereinafter referred to as a VCI). Then, the MSC transmits a radio access bearer (hereinafter referred to as an RAB) assignment request message (RAB assignment req) to the RNC and waits for an AAL2 channel identifier (CID) setup request from the RNC. Resource is one of between MSC and RNC based on ATM transmission technique and thus, includes all the assignment of VPI (Virtual Path Identifier), VCI (Virtual Channel Identifier) and CID (Connection Identifier). Herein, VP comprises several VCs and VC comprises several AAL2 connections (CID).

Since radio resources are insufficient, the RNC returns an RAB assignment response (RAB assignment rsp) as a failure value while setting up radio bearers (RBs) with a node-B and a user equipment (UE). Here, the cause value for the failure will have a meaning of "no available channel resource", as set forth in the 3GPP TS 25.413 standard.

When channel resources are not available as described above, the method of the present invention may still transfer a caller's message to another party by carrying out operations as follows.

The MSC receives the RAB assignment response message of "no available channel resource" and renders the reserved resources (VPI and VCI) available at step 760. Then, without releasing the call, the MSC transmits to the MS a facility message including information indicative of the fact that the call is not connected because of resource insufficiency and an SMS can be provided instead of voice communication.

The RNC, which has transmitted the RAB assignment response of "no available channel resource" to the MSC, does not carry out a call release process and maintains a signaling connection state as it is (namely, even in the case that there is no available resource as described above).

The facility message is of two types, a supplementary service (SS) type and a call control (CC) type, the latter of which is used in the present embodiment.

After the MS receives the facility message, it sends a message to the user through its application layer and a user interface, which message indicates that the call cannot be connected due to resource insufficiency resulting from the current traffic saturation state at step 550. Then, the MS asks the user whether he/she wishes to carry out SMS message transmission at step 560. As a result, the user can recognize why his/her call has not been set up and that he/she can currently transmit his/her message through the SMS. If the user wishes to carry out the SMS message transmission, the MS transmits CP-DATA to the MSC. The subsequent SMS procedures are identical to conventional procedures. However, a signaling channel need not be set up again since it has been already set up through voice call signaling.

If the user wishes to terminate the call instead of transmitting an SMS message, the MS transmits a disconnect message to the MSC. The subsequent call release procedures are identical to conventional procedures. Although not shown in FIG. 3, upon receiving the disconnect message, the MSC transmits a call release message to the MS to instruct it to release the call.

Figure 4:
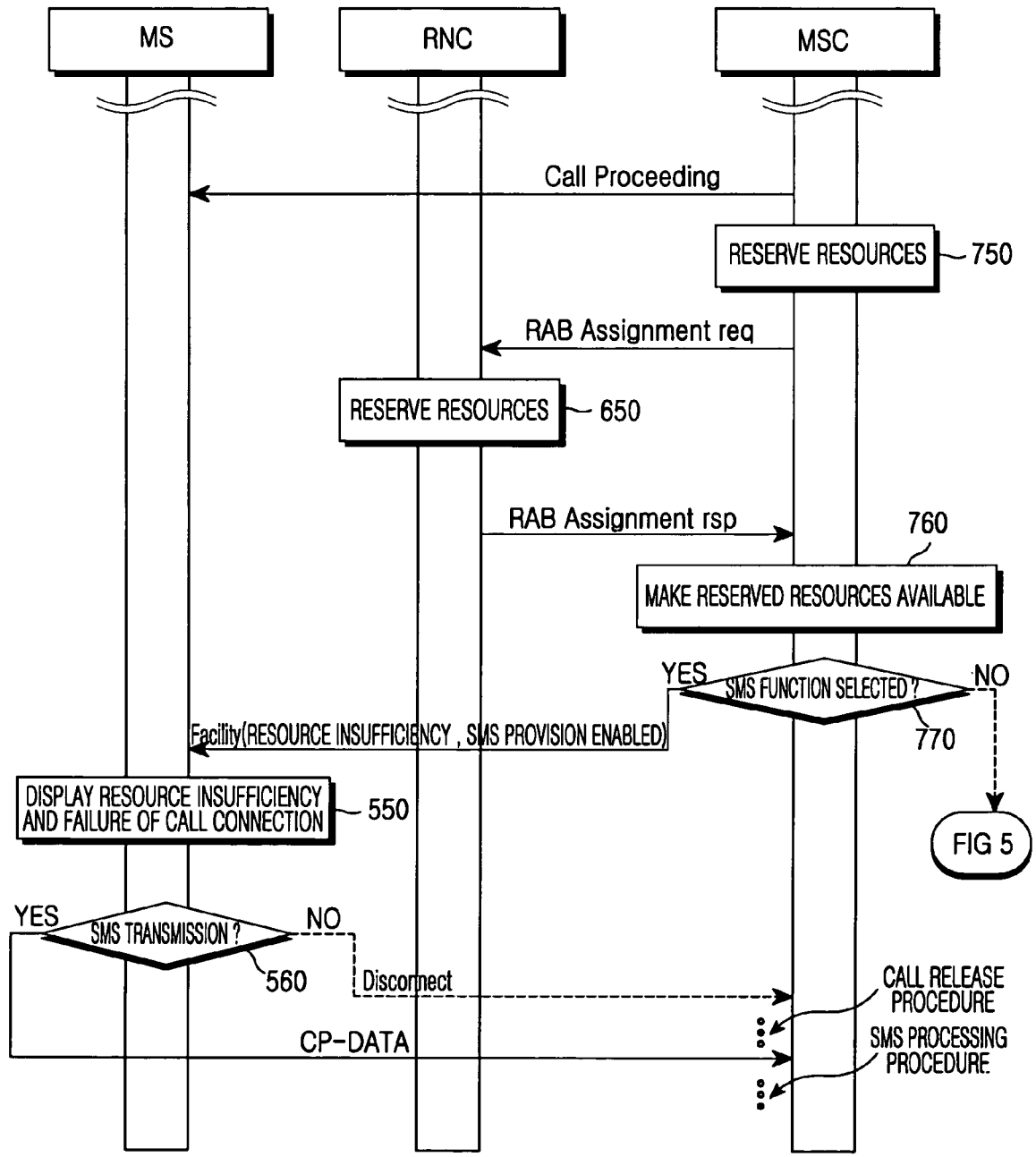
FIG. 4 is a flow diagram illustrating a method for changing a current call service to a short message service without releasing a desired call under the condition that a speech path cannot be set up due to traffic congestion, in accordance with a second embodiment of the present invention.

FIG. 4 is a flow diagram illustrating a method for changing a current call service to a short message service without releasing a desired call under the condition that a speech path cannot be set up due to traffic congestion, in accordance with a second embodiment of the present invention.

Compared with the first embodiment of FIG. 3, the second embodiment of FIG. 4 is different from the first embodiment in that it further includes step 770 of allowing an operator of the MSC to check through an MSC operating program whether an SMS function has been selected, after the MSC makes the reserved resources available at step 760. This further step is performed to enable the user to select an SMS function as an additional function. The second embodiment of FIG. 4, and a third embodiment of FIG. 5 to be described below are advantageous for charged services, whereas the first embodiment of FIG. 3 is advantageous for no-charge services.

The MSC checks through its MSC operating program whether the MS subscriber has additionally selected the SMS function. If the MS subscriber has selected the SMS function, the MSC transmits to the MS a facility message including information indicative of the fact that the call is not connected because of resource insufficiency and the SMS can be provided instead of voice communication. The subsequent operation is performed in the same manner as that in FIG. 3.

Figure 5:
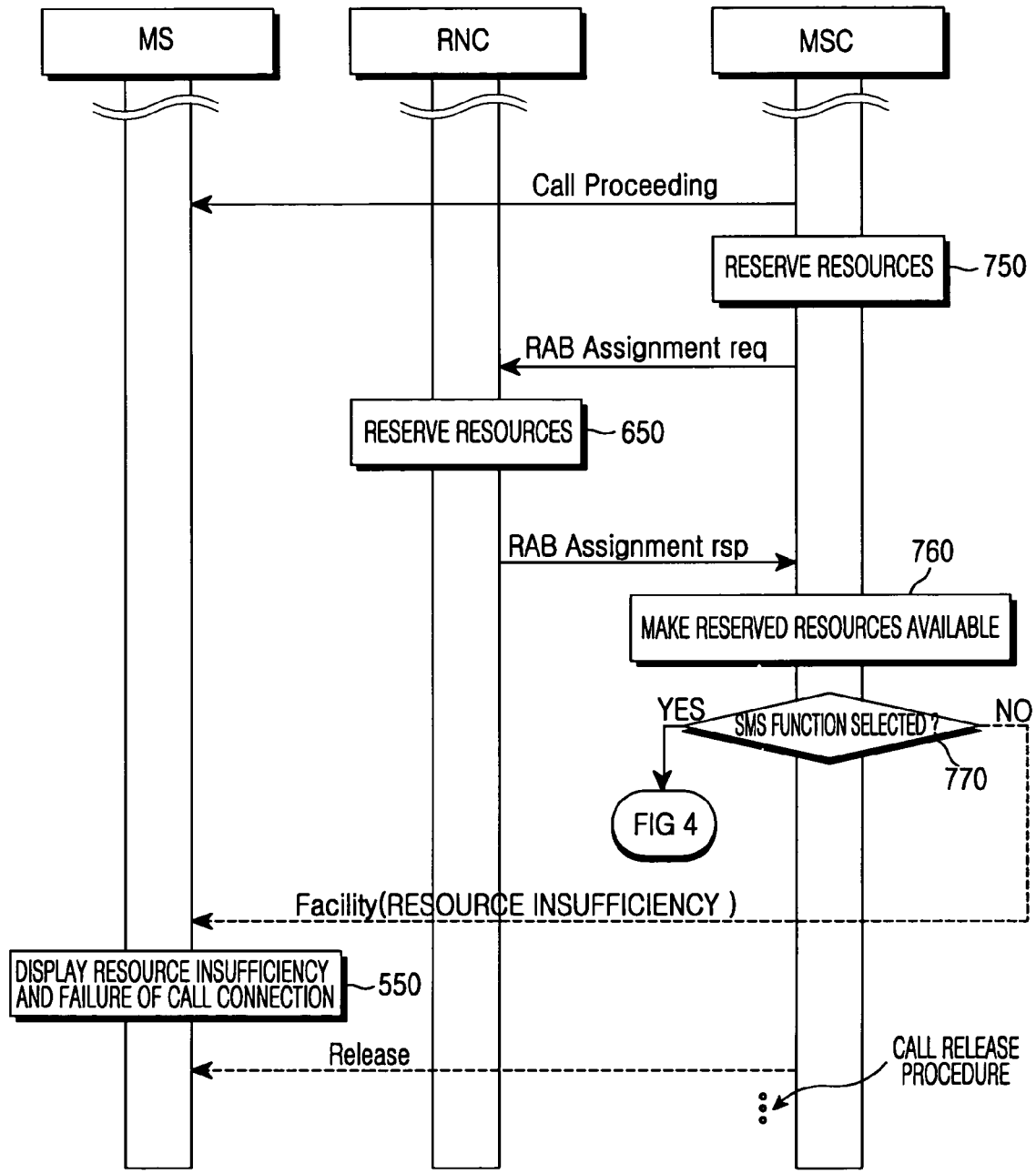
FIG. 5 is a flow diagram illustrating a method for notifying a user of the cause of a call failure under the condition that a speech path cannot be set up due to traffic congestion, in accordance with a third embodiment of the present invention.

FIG. 5 is a flow diagram illustrating a method for notifying a user of the cause of a call failure under the condition that a speech path cannot be set up due to traffic congestion, in accordance with the third embodiment of the present invention.

Compared with the second embodiment of FIG. 4, the third embodiment of FIG. 5 corresponds to the case where the SMS function has not been selected, as a result of checking whether the MS subscriber has selected the SMS function additionally. In this case, the MSC transmits to the MS a facility message including information indicative of the fact that the call is not connected because of resource insufficiency. After the MS receives the facility message, it sends a message to the user through the user interface, which message indicates that the call cannot be connected due to resource insufficiency resulting from the current traffic saturation state (550). Then, if the MS receives a call release message from the MSC, it carries out a call release procedure.

The present invention can be applied to an asynchronous mobile communication system as well as a UMTS terminal and a UMTS system.

As described above, in accordance with the present inventions a user can be made aware of the cause of a call failure and send his/her message to another party through an SMS, even though a traffic channel cannot be allocated due to traffic congestion, or an announcement message or ring signal is not available. Therefore, the user is spared inconveniences resulting from the non-recognition of the call failure cause and the inability to send an important message.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for providing a call processing service during a traffic congestion state in a mobile communication network, comprising the steps of
   a) transmitting a call proceeding signal from a mobile switching center to a mobile station of a calling subscriber through a radio network controller;
   b) carrying out a resource reservation between the mobile switching center and the radio network controller;
   c) making, when a call has failed, reserved resources for the call available from the mobile switching center and then transmitting a facility signal to the mobile station, the facility signal including information about a cause of a call failure; and
   d) receiving the facility signal at the mobile station and then displaying the information about the cause of the call failure.

2. The method as set forth in claim 1, wherein the facility signal further includes information indicating that a short message service can be provided;
   wherein the method further comprises e), transmitting the entered short message from the mobile station to the mobile switching center through a signaling channel remaining connected, if the calling subscriber enters a desired short message for transmission to the other party after the information about the cause of the call failure is displayed on the basis of the facility signal.

3. The method as set forth in claim 2, wherein step e) comprises the steps of:

e-1) determining at the mobile station whether the calling subscriber wishes to transmit the short message to the other party, after the information about the cause of the call failure is displayed;

e-2) transmitting from the mobile station the short message entered by the calling subscriber to the mobile switching center through the signaling channel if it is determined that the calling subscriber wishes to transmit the short message; and e-3) carrying out a call release procedure at the mobile station if it is determined that the calling subscriber does not wish to transmit the short message.

4. The method as set forth in claim 1, further comprising e) carrying out a call release procedure at the mobile station after displaying the information about the cause of the call failure.

5. The method as set forth in claim 1, wherein step b) comprises the steps of:

b-1) after the call proceeding signal is transmitted, carrying out the resource reservation at the mobile switching center and then transmitting a radio access bearer assignment request signal to the radio network controller; and b-2) allowing the radio network controller to receive the radio access bearer assignment request signal at the radio network controller, carrying out the resource reservation and then transmitting a radio access bearer assignment response signal to the mobile switching center, the radio access bearer assignment response signal having a value indicative of the cause of the call failure.

6. The method as set forth in claim 5, wherein the reserved resources include a virtual path identifier and a virtual channel identifier.

7. The method as set forth in claim 1, wherein step c) comprises the steps of:

making the reserved resources available at the mobile switching center;

determining whether the subscriber of the mobile station has selected a short message service function; and if the subscriber of the mobile station is determined to have selected the short message service function, transmitting the facility signal including the information about the cause of the call failure to the mobile station through the radio network controller.

8. A method for providing a call processing service during a traffic congestion state in a mobile communication network, comprising the steps of:

a) transmitting a call proceeding signal from a mobile switching center to a mobile station of a calling subscriber through a radio network controller;

b) carrying out a resource reservation between the mobile switching center and the radio network controller;

c) making, when a call has failed, reserved resources for the call available from the mobile switching center by releasing the resource reservation made for the call and then transmitting a facility signal to the mobile station, the facility signal including information about a cause of a call failure; and d) receiving the facility signal at the mobile station and then displaying the information about the cause of the call failure, wherein step b) comprises the steps of:

b-1) after the call proceeding signal is transmitted, carrying out the resource reservation at the mobile switching center and then transmitting a radio access bearer assignment request signal to the radio network controller; and b-2) allowing the radio network controller to receive the radio access bearer assignment request signal at the radio network controller, carrying out the resource reservation and then transmitting a radio access bearer assignment response signal to the mobile switching center, the radio access bearer assignment response signal having a value indicative of the cause of the call failure.

9. The method as set forth in claim 8, wherein the reserved resources include a virtual path identifier and a virtual channel identifier.

10. A method for providing a call processing service during a traffic congestion state in a mobile communication network, comprising the steps of:

a) transmitting a call proceeding signal from a mobile switching center to a mobile station of a calling subscriber through a radio network controller;

b) carrying out a resource reservation between the mobile switching center and the radio network controller;

c) making, when a call has failed, reserved resources for the call available from the mobile switching center by releasing the resource reservation made for the call and then transmitting a facility signal to the mobile station, the facility signal including information about a cause of a call failure; and d) receiving the facility signal at the mobile station and then displaying the information about the cause of the call failure, wherein step c) comprises the steps of:

making the reserved resources available at the mobile switching center;

determining whether the subscriber of the mobile station has selected a short message service function; and if the subscriber of the mobile station is determined to have selected the short message service function, transmitting the facility signal including the information about the cause of the call failure to the mobile station through the radio network controller.

* * * * *